(12) United States Patent
Zywiak et al.

(10) Patent No.: US 10,086,946 B1
(45) Date of Patent: Oct. 2, 2018

(54) HYBRID THIRD AIR CONDITION PACK

(71) Applicant: Hamilton Sundstrand Corporation, Charlotte, NC (US)

(72) Inventors: Thomas M. Zywiak, Southwick, MA (US); Gregory L. DeFrancesco, Simsbury, CT (US); David E. Hall, Southington, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 15/477,881

(22) Filed: Apr. 3, 2017

(51) Int. Cl.
| | |
|---|---|
| *B64D 13/08* | (2006.01) |
| *F04D 25/04* | (2006.01) |
| *F04D 29/58* | (2006.01) |
| *F04D 29/053* | (2006.01) |
| *B64D 13/02* | (2006.01) |
| *B64D 13/06* | (2006.01) |

(52) U.S. Cl.
CPC ............. *B64D 13/08* (2013.01); *B64D 13/02* (2013.01); *F04D 25/045* (2013.01); *F04D 29/053* (2013.01); *F04D 29/5826* (2013.01); *B64D 2013/0618* (2013.01); *B64D 2013/0648* (2013.01)

(58) Field of Classification Search
CPC .................... B64D 13/08; B64D 13/02; B64D 2013/0648; B64D 2013/0618; F04D 29/5826
See application file for complete search history.

(56) References Cited

U.S. PATENT DOCUMENTS

| | | | | |
|---|---|---|---|---|
| 4,419,926 A | | 12/1983 | Cronin et al. | |
| 5,704,218 A | * | 1/1998 | Christians | B64D 13/06 62/172 |
| 5,911,388 A | | 6/1999 | Severson et al. | |
| 6,526,775 B1 | * | 3/2003 | Asfia | B64D 13/06 62/402 |
| 6,928,832 B2 | * | 8/2005 | Lents | B64D 13/06 62/401 |
| 7,467,524 B2 | * | 12/2008 | Brutscher | B64D 13/06 62/401 |
| 9,003,814 B2 | | 4/2015 | Zywiak et al. | |
| 2004/0112220 A1 | * | 6/2004 | Defrancesco | A62B 7/14 96/108 |

(Continued)

FOREIGN PATENT DOCUMENTS

| | | |
|---|---|---|
| EP | 0888966 A2 | 1/1999 |
| JP | 4136809 B2 | 8/2008 |
| WO | 2009007094 A2 | 1/2009 |

OTHER PUBLICATIONS

Extended European Search Report for European Application No. 18165479.9 dated May 7, 2018; 7 pages.

*Primary Examiner* — Kun Kai Ma
(74) *Attorney, Agent, or Firm* — Cantor Colburn LLP

(57) ABSTRACT

An airplane is provided. The airplane includes a pack. The pack includes a shaft, a compressor, a turbine coupled to the compressor via the shaft; and a heat exchanger. The compressor receives and compresses a first medium in accordance with power provided by the turbine via the shaft. The turbine receives and expands a second medium to provide the power to the compressor via the shaft. The heat exchanger is configured to cool the first medium.

9 Claims, 5 Drawing Sheets

(56) References Cited

U.S. PATENT DOCUMENTS

| | | | |
|---|---|---|---|
| 2004/0231350 A1* | 11/2004 | Kline | B64D 13/00 62/244 |
| 2008/0110193 A1* | 5/2008 | Jonqueres | B64D 13/06 62/331 |
| 2008/0264084 A1* | 10/2008 | Derouineau | B64D 13/06 62/172 |
| 2009/0117840 A1* | 5/2009 | Kresser | B64D 13/06 454/71 |
| 2013/0036730 A1* | 2/2013 | Bruno | B64C 13/40 60/486 |
| 2015/0166187 A1 | 6/2015 | Durbin et al. | |
| 2015/0251765 A1* | 9/2015 | Jonqueres | B64D 13/08 62/86 |
| 2015/0329210 A1 | 11/2015 | Bammann et al. | |
| 2016/0083100 A1 | 3/2016 | Bammann et al. | |
| 2016/0146114 A1 | 5/2016 | Bruno | |
| 2016/0355268 A1 | 12/2016 | Bruno | |
| 2016/0355270 A1 | 12/2016 | Bruno et al. | |
| 2017/0060125 A1* | 3/2017 | Beaven | G05B 23/0235 |

\* cited by examiner

HYBRID THIRD AIR CONDITION PACK

BACKGROUND

In general, conventional air conditioning systems utilize engine bleed air to cool, heat, pressurize, and provide fresh air to occupants in an aircraft cabin. Every lb/min of bleed air used to ventilate the aircraft cabin is a penalty to the aircraft performance throughout an operating envelope of the aircraft. Minimum required fresh air flow rates per occupant are set by regulation authorities and must be met. Conventional air conditioning systems fail to properly strike a balance between reducing bleed air consumption while still meeting fresh air flow requirements to reduce fuel burn and aircraft operational costs.

BRIEF DESCRIPTION

According to one or more embodiments, a pack is provided. The pack includes a shaft, a compressor, a turbine coupled to the compressor via the shaft; and a heat exchanger. The compressor receives and compresses a first medium in accordance with power provided by the turbine via the shaft. The turbine receives and expands a second medium to provide the power to the compressor via the shaft. The heat exchanger is configured to cool the first medium.

According to one or more embodiments or the pack embodiment above, the at least one heat exchanger can be configured to cool the first medium by utilizing the second medium.

According to one or more embodiments or any of the pack embodiments above, the at least one heat exchanger can be configured to cool the first medium by utilizing the second medium.

According to one or more embodiments or any of the pack embodiments above, the at least one heat exchanger can be downstream of the turbine on a flow path of the second medium.

According to one or more embodiments or any of the pack embodiments above, the at least one heat exchanger can be upstream of the turbine on a flow path of the second medium.

According to one or more embodiments or any of the pack embodiments above, the at least one heat exchanger can comprises a first heat exchanger downstream of the turbine on a flow path of the second medium and a second heat exchanger upstream of the turbine on the flow path of the second medium.

According to one or more embodiments or any of the pack embodiments above, the second heat exchanger upstream of the turbine can utilize a third medium to cool the second medium.

According to one or more embodiments or any of the pack embodiments above, the second heat exchanger upstream of the turbine can utilize the second medium to cool the first medium.

According to one or more embodiments or any of the pack embodiments above, the first medium can be fresh air and the second medium can be cabin discharge air.

According to one or more embodiments or any of the pack embodiments above, the second medium can flow to a ram circuit or overboard after exiting the pack.

According to one or more embodiments or any of the pack embodiments above, an environmental control system of an aircraft can comprise the pack.

According to one or more embodiments or any of the pack embodiments above, the environmental control system can further comprise at least one air conditioning pack.

According to one or more embodiments, an environmental control system is provided. The environmental control system comprising a first air conditioning pack; a second air conditioning pack; a mixing circuit; and a supplemental pack comprising a shaft, a compressor, a turbine coupled to the compressor via the shaft, and at least one heat exchanger, wherein the compressor receives and compresses a first medium in accordance with power provided by the turbine via the shaft, wherein the turbine receives and expands a second medium to provide the power to the compressor via the shaft, wherein the at least one heat exchanger is configured to cool the first medium.

According to one or more embodiments or the environmental control system embodiment above, the at least one heat exchanger can be configured to cool the first medium by utilizing the second medium.

According to one or more embodiments or any of the environmental control system embodiments above, the at least one heat exchanger can be downstream of the turbine on a flow path of the second medium.

According to one or more embodiments or any of the environmental control system embodiments above, the at least one heat exchanger can be upstream of the turbine on a flow path of the second medium.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide a hybrid pack architecture that has two air conditioning packs and a supplemental pack configuration. The supplemental pack can provide a significant bleed air flow reduction by utilizing cabin discharge air expanded though a turbine to power a fresh ram air compressor. The air expanded through the turbine can be used as a heat sink for a compressor outlet air prior to being supplied to a cabin air distribution system. Also, after cooling the fresh air, exhaust air of the supplemental pack can be ported to a ram circuit and provide cooling of the bleed air used for one or both of the air conditioning packs.

The technical effects and benefits of the above the supplemental pack include reduction of bleed air from the engines and/or a reduction in ram air used by the air conditioning packs (e.g., providing a further reduction in the aircraft fuel burn by reducing the drag penalty associated with the ram air flow reduction due to the supply of the exhaust air to the ram circuit). The hybrid pack architecture can be utilized as a drop-in for existing aircraft without modifications to the existing packs or it could be used on a new design to provide some potential size reductions of pack components that are sized for cruise operation.

Figure 1:
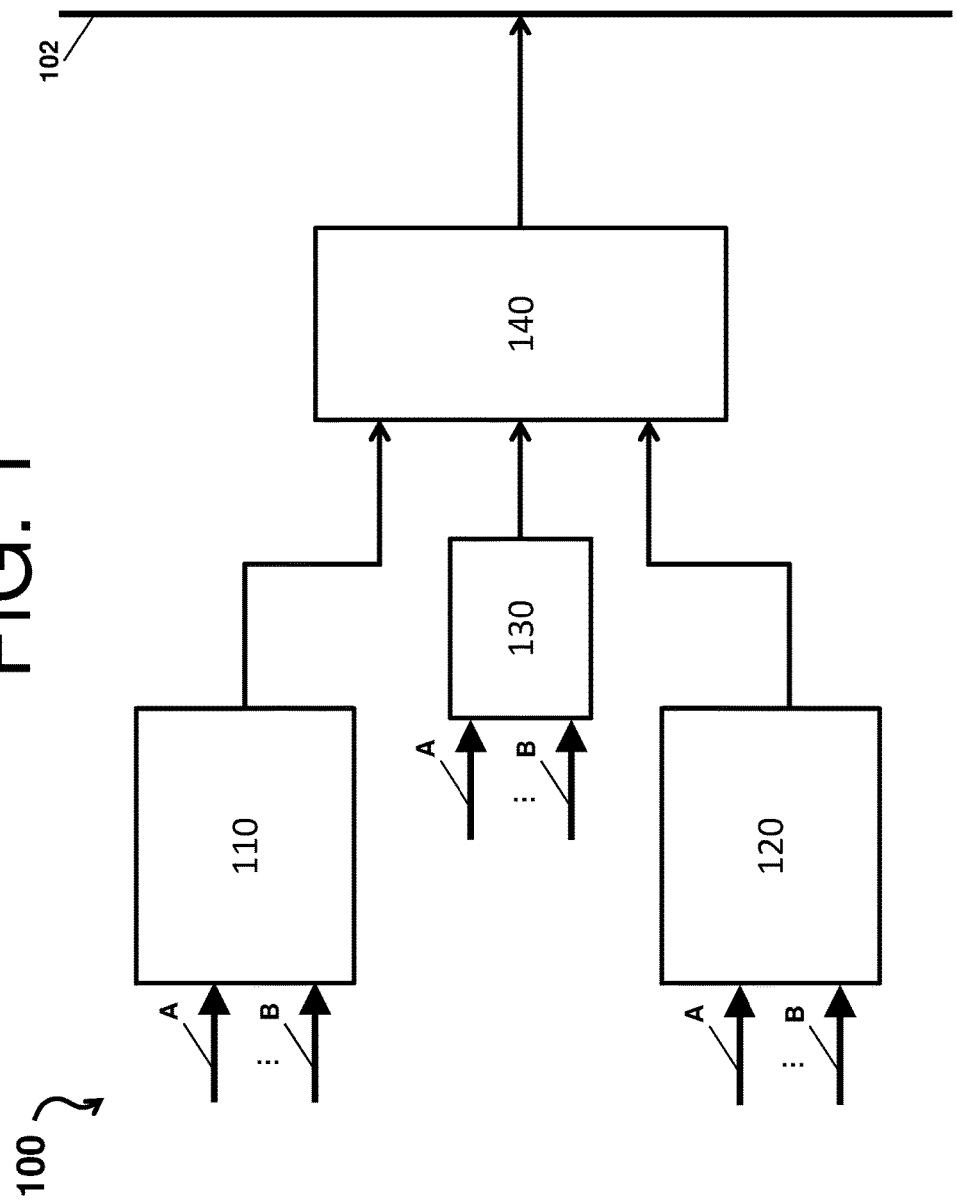
FIG. 1 is a diagram of a schematic of a hybrid pack architecture according to one or more embodiments.

Turning now to FIG. 1, a diagram of a schematic of a hybrid pack architecture 100 is depicted according to one or more embodiments. The hybrid pack architecture 100 comprises a volume 102, a first air conditioning pack 110, a second air conditioning pack 120, a supplemental pack 130, and a mixing circuit 140.

The hybrid pack architecture 100 is an example of an environmental control system of an aircraft that conditions and mixes mediums from different sources (e.g., arrows A and B) and uses the different energy sources to power the environmental control system and to provide cabin pressurization and cooling at high fuel burn efficiency (e.g., provide a mixed medium to a volume 102). The medium can generally be air, while other examples include gases, or liquids.

The elements of the hybrid pack architecture 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the hybrid pack architecture 100. Valves can be operated by actuators, such that flow rates of the medium in any portion of the hybrid pack architecture 100 can be regulated to a desired value.

The schematic of the hybrid pack architecture 100 is depicted according to a non-limiting embodiment, as it could be installed on an aircraft. The aircraft example is not intended to be limiting, as alternative embodiments are contemplated In view of the above aircraft embodiment, a first medium can be bleed air, which is pressurized air supplied to or originating from (being "bled' from) an engine or auxiliary power unit of the aircraft. Note that temperature, humidity, and pressure of the bleed air can vary widely depending upon a compressor stage and revolutions per minute of the engine. Generally, the bleed air described herein is low-pressure air. The volume 102 can be pressurized air within an aircraft cabin or a combined flight deck and aircraft cabin. Generally, the pressurized air described herein is at a pressure that creates a safe and comfortable environment for humans on the aircraft.

A second medium can be fresh air, which can be outside air destined to enter the volume 102. The outside air can be procured by one or more scooping mechanisms, such as an impact scoop or a flush scoop. These scooping mechanisms can be considered fresh air or outside air inlets. Generally, the fresh air described herein is at an ambient pressure outside of the aircraft with respect to altitude.

A third medium can be procured from the volume 102. That is, the third medium can be cabin discharge air, which can be air leaving the volume 102 and dumped/discharged overboard. For example, the cabin discharge air can be supplied to a destination, such as an outlet. Examples of the outlet can include, but are not limited to, overboard after exiting the pack and/or a ram circuit (which exhausts overboard).

The mixing circuit 140 is a mechanical configuration that combines the conditioned medium flowing from the air conditioning packs 110 and 120 and the supplemental pack 130 and provides a resulting combined conditioned medium to the volume 102.

The first air conditioning pack 110 and the second air conditioning pack 120 can individually perform or extract work from the above mediums to achieve certain operations required at different altitudes. The air conditioning packs 110 and 120 can comprise a ram circuit including a shell encasing one or more heat exchangers. The shell can receive and direct a medium (such as ram air described herein) through its corresponding pack. The one or more heat exchangers are devices built for efficient heat transfer from one medium to another. Examples of heat exchangers include double pipe, shell and tube, plate, plate and shell, adiabatic wheel, plate fin, pillow plate, and fluid heat exchangers. The one or more heat exchangers encased by the shell can be referred to as ram heat exchangers.

The air conditioning packs 110 and 120 can comprise a compressing device including various combinations of compressors, turbines, fans, and shafts. The compressing device is a mechanical device that includes components for performing thermodynamic work on the mediums. Examples of the compressing device 109 include an air cycle machine, a three-wheel air cycle machine, a four-wheel air cycle machine, etc. The air conditioning packs 110 and 120 can also comprise water extractors, a condensers, etc.

The supplemental pack 130 can comprise different arrangements of compressors and heat exchangers, which can be used to reduce an overall bleed air penalty. Example arrangements will now be described with respect to FIGS. 2-5.

Figure 2:
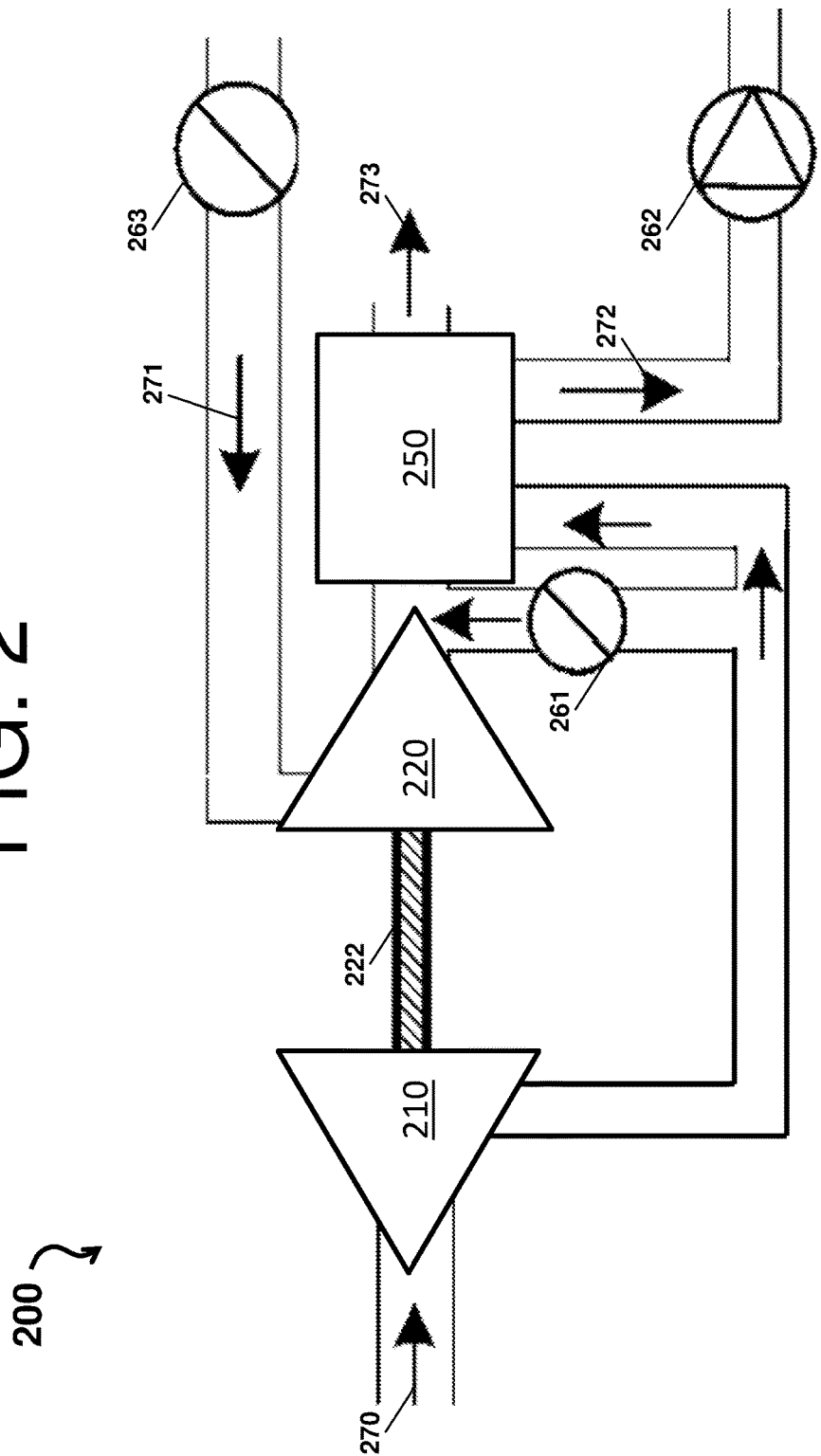
FIG. 2 is a diagram of a schematic of a supplemental pack according to one or more embodiments.

FIG. 2 is a diagram of a schematic of a pack 200 according to one or more embodiments. The pack 200 comprises a compressor 210, a turbine 220, a shaft 222, and a heat exchanger 250. The pack 200 also comprises valves 261, 262, and 263 and the mediums 270, 271, 272, and 273. The pack 200 can be considered a downstream heat exchanger arrangement where the heat exchanger 250 is downstream of the turbine 220 on a flow path of the medium 271.

In an example operation of the pack 200, the compressor 210 receives and compresses the medium 270 (e.g., fresh air). The turbine 220 provides power to the compressor 210 through the shaft 222 by expanding the medium 271 (e.g., cabin discharge air).

The heat exchanger 250 utilizes the exhaust of the turbine 220 (e.g., cool cabin discharge air) to cool the compressed and heated medium 270 flowing from the turbine 210. The heat exchanger 250, in turn, provides the medium 272 to the mixing unit 140 as a cool and compressed version of the medium 270. Note the medium 273 exiting from the heat exchanger 250 can be provided overboard after exiting the pack and/or a ram circuit (which exhausts overboard).

Note that, in an embodiment, an expected flow ratio of turbine discharge air to compressor fresh air is approximately 1.70. So that 1.70 lb/min of cabin discharge air can produce 1.0 lb/min of fresh air offsetting a 1.0 lb/min of bleed air extraction.

Figure 3:
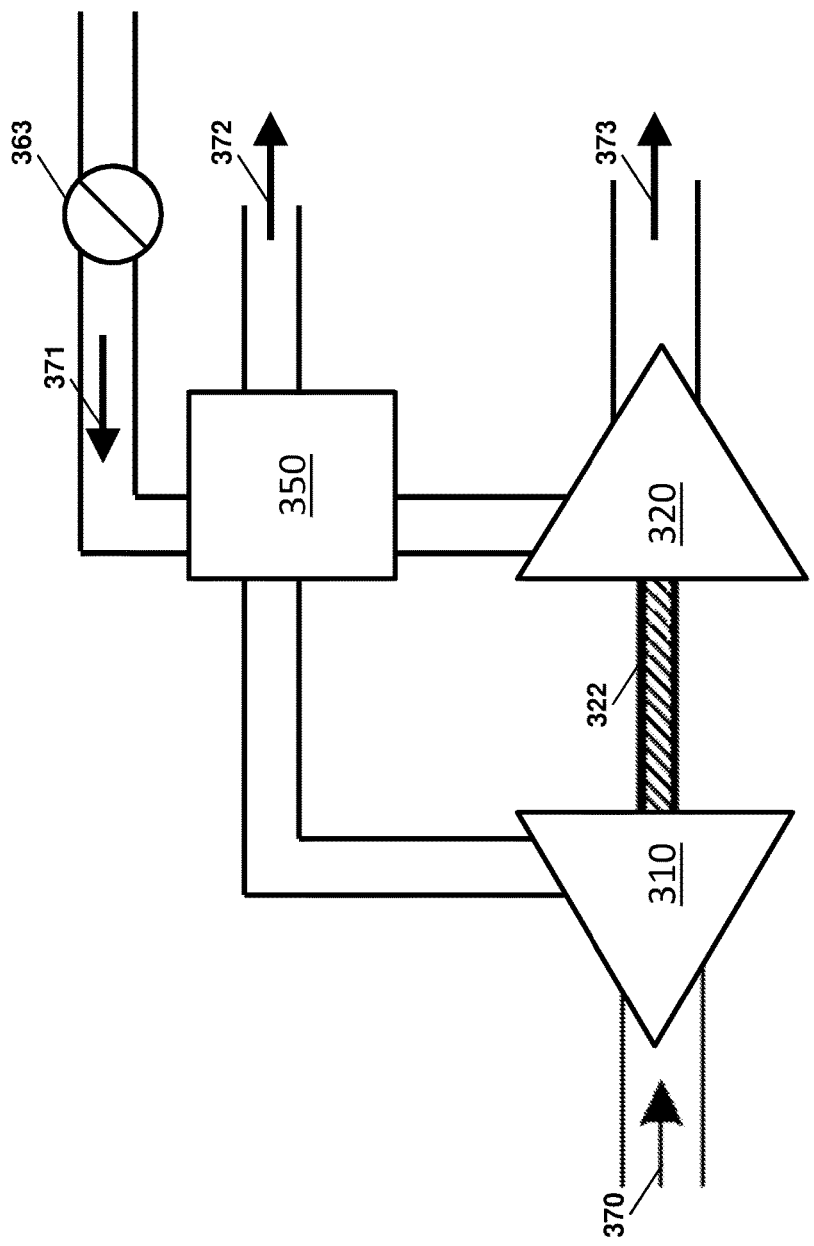
FIG. 3 is a diagram of a schematic of a supplemental pack according to one or more embodiments.

FIG. 3 is a diagram of a schematic of a pack 300 according to one or more embodiments. The pack 300 comprises a compressor 310, a turbine 320, a shaft 322, and a heat exchanger 350. The pack 200 also comprises valve 363 and the mediums 370, 371, 372, and 373. The pack 300 can be considered a upstream heat exchanger arrangement where the heat exchanger 350 is upstream of the turbine 320 on a flow path of the medium 371.

In an example operation of the pack 300, the compressor 310 receives and compresses the medium 370 (e.g., fresh air). The turbine 320 provides power to the compressor 310 through the shaft 322 by expanding the medium 371 (e.g., cabin discharge air). The heat exchanger 350 utilizes the medium 371 (e.g., cabin discharge air) to cool the compressed and heated medium 370 flowing from the turbine 310. The heat exchanger 350, in turn, provides the medium 372 to the mixing unit 140 as a cool and compressed version of the medium 370. Note the medium 371 exiting from the heat exchanger 350 can be provided to the turbine 320 followed by a ram circuit and/or an overboard.

Figure 4:
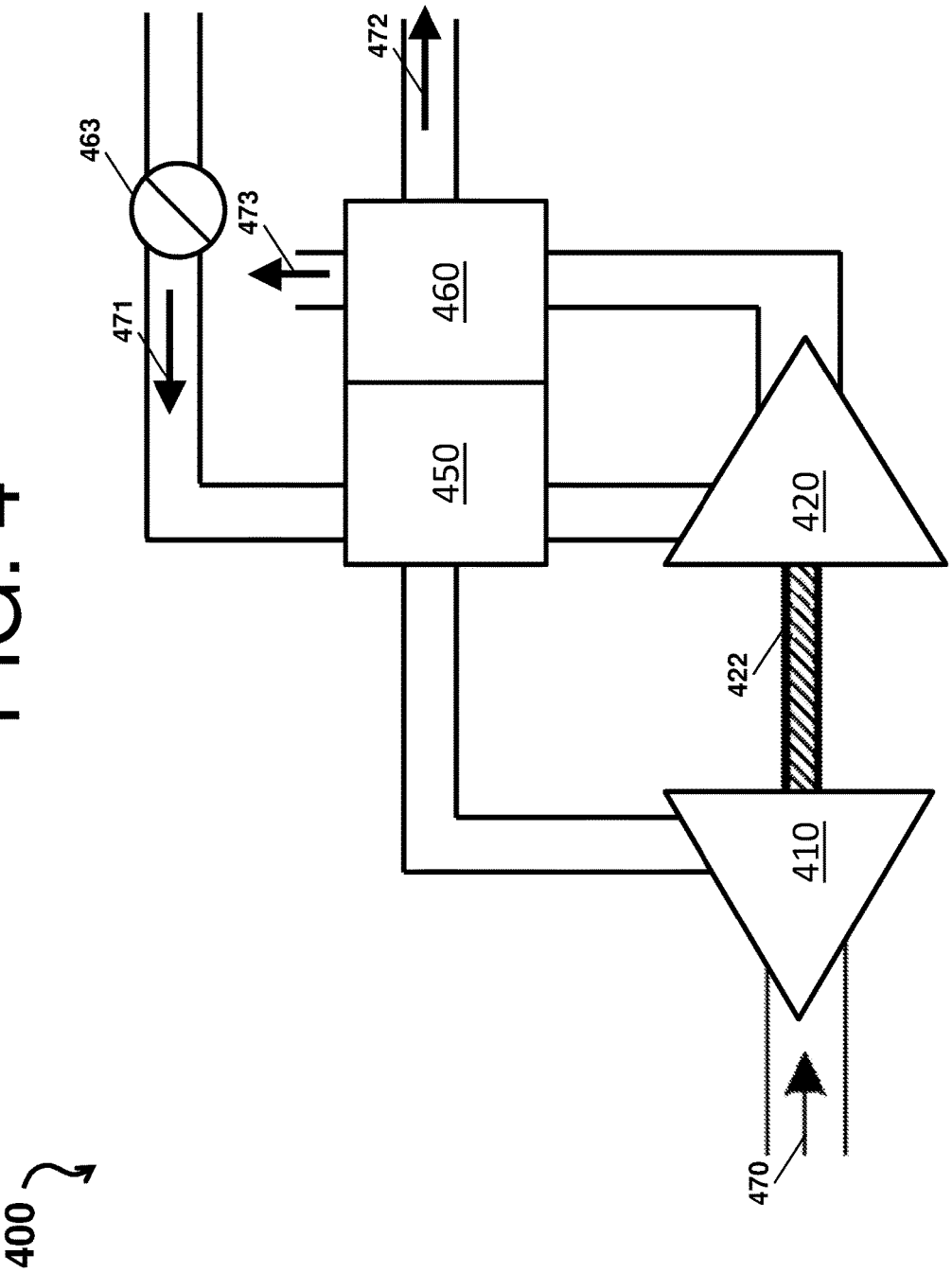
FIG. 4 is a diagram of a schematic of a supplemental pack according to one or more embodiments.

FIG. 4 is a diagram of a schematic of a pack 400 according to one or more embodiments. The pack 400 comprises a compressor 410, a turbine 420, a shaft 422, a heat exchanger 450, and a heat exchanger 460. The pack 400 also comprises valve 463 and the mediums 470, 471, 472, and 473. The pack 400 can be considered a combined heat exchanger arrangement where the heat exchanger 450 is upstream of the turbine 420 on a flow path of the medium 471 and the heat exchanger 460 is downstream of the turbine 420 on the flow path of the medium 471.

In an example operation of the pack 400, the compressor 410 receives and compresses the medium 470 (e.g., fresh air). The turbine 420 provides power to the compressor 410 through the shaft 422 by expanding the medium 471 (e.g., cabin discharge air). Before expansion of the medium 471, the heat exchanger 450 utilizes the medium 471 to cool the compressed and heated medium 470 flowing from the turbine 410. After expansion of the medium 471, the heat exchanger 460 utilizes the medium 471 to further cool the compressed and heated medium 470 flowing from the heat exchanger 450. The heat exchanger 460, in turn, provides the medium 472 to the mixing unit 140 as a cool and compressed version of the medium 470. Note the medium 471 exiting from the heat exchanger 450 can be provided to the turbine 420 followed by the heat exchanger 450 followed by a ram circuit and/or overboard.

Figure 5:
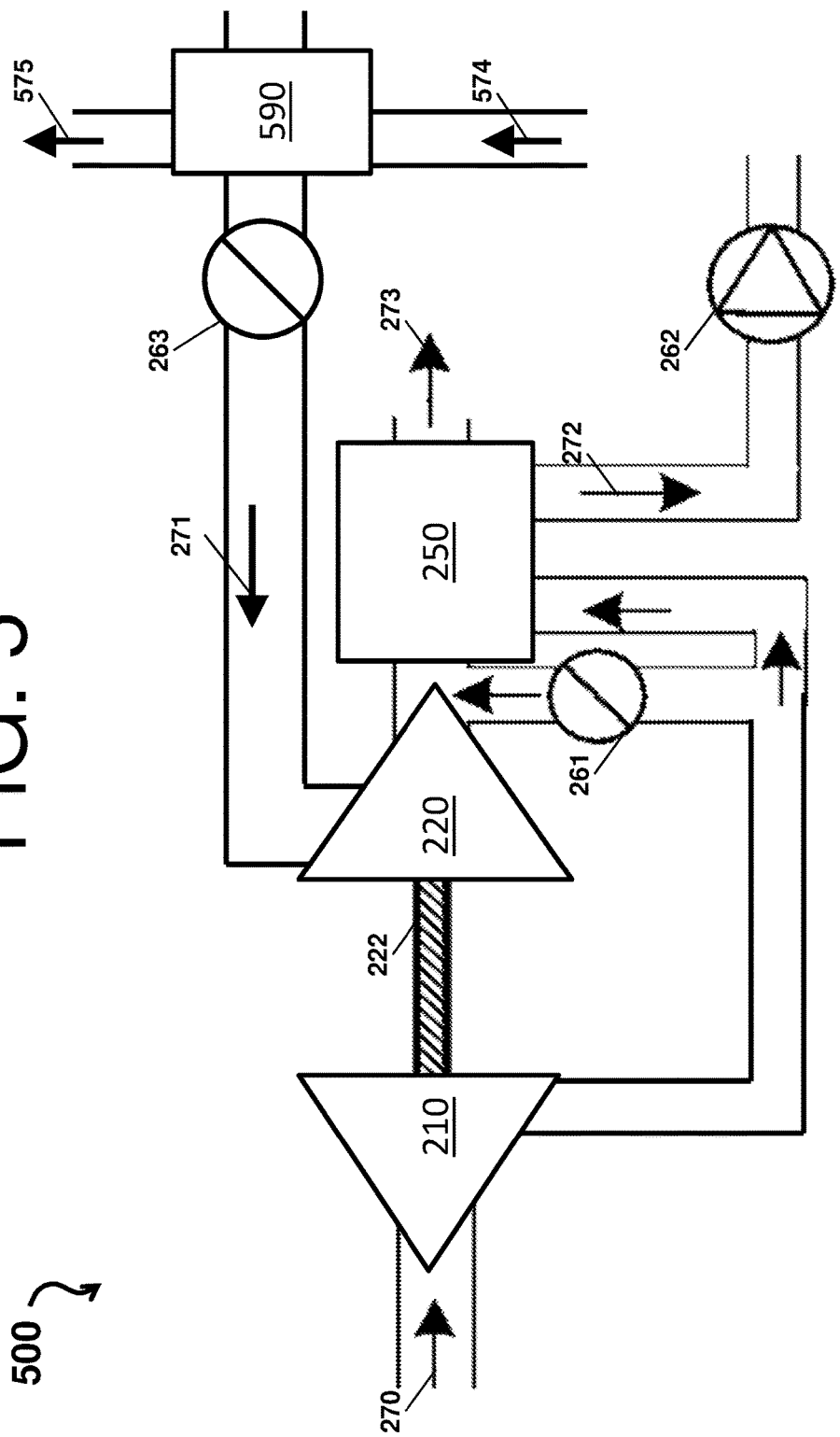
FIG. 5 is a diagram of a schematic of a supplemental pack according to one or more embodiments.

FIG. 5 is a diagram of a schematic of a pack 500 according to one or more embodiments. Components of the pack 500 that are similar to the pack 200 have been reused for ease of explanation, by using the same identifiers, and are not re-introduced. The pack 500 comprises a heat exchanger 590 and the mediums 574 and 575. The heat exchanger 590 is upstream of the turbine 220 on the flow path of the medium 271. The heat exchanger 590 utilizes a medium 574 to heat the medium 271. The medium 574 exhausts from the heat exchanger 590 as the medium 575. The heat exchanger 590 thereby provides cooling to the medium 574, which can be advantageous to the components using medium 575.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A pack, comprising:
   a shaft;
   a compressor;
   a turbine coupled to the compressor via the shaft; and
   at least one heat exchanger,
   wherein the compressor receives and compresses a first medium in accordance with power provided by the turbine via the shaft,
   wherein the turbine receives and expands a second medium to provide the power to the compressor via the shaft,
   wherein the at least one heat exchanger is configured to cool the first medium,
   wherein the at least one heat exchanger comprises a first heat exchanger downstream of the turbine on a flow path of the second medium and a second heat exchanger upstream of the turbine on the flow path of the second medium,
   wherein the second heat exchanger upstream of the turbine utilizes a third medium to heat the second medium.

2. The pack of claim 1, wherein the first heat exchanger is configured to cool the first medium by utilizing the second medium.

3. The pack of claim 1, wherein the second heat exchanger upstream of the turbine utilizes the second medium to cool the third medium.

4. The pack of claim 1, wherein the first medium is fresh air and the second medium is cabin discharge air.

5. The pack of claim 1, wherein the second medium flows to a ram circuit or overboard after exiting the pack.

6. The pack of claim 1, wherein an environmental control system of an aircraft comprises the pack.

7. The pack of claim 6, wherein the environmental control system further comprises at least one air conditioning pack.

8. An environmental control system, comprising:
   a first air conditioning pack;
   a second air conditioning pack;
   a mixing circuit; and
   a supplemental pack comprising a shaft, a compressor, a turbine coupled to the compressor via the shaft, and at least one heat exchanger,
   wherein the compressor receives and compresses a first medium in accordance with power provided by the turbine via the shaft, wherein the turbine receives and expands a second medium to provide the power to the compressor via the shaft, wherein the at least one heat exchanger is configured to cool the first medium, wherein the at least one heat exchanger comprises a first heat exchanger downstream of the turbine on a flow path of the second medium and a second heat exchanger upstream of the turbine on the flow path of the second medium, wherein the second heat exchanger upstream of the turbine utilizes a third medium to heat the second medium.

9. The environmental control system of claim 8, wherein the first heat exchanger is configured to cool the first medium by utilizing the second medium.

* * * * *